(12) United States Patent
Ozaki et al.

(10) Patent No.: US 7,128,858 B2
(45) Date of Patent: Oct. 31, 2006

(54) METHOD FOR PRODUCING WOODY MOLDINGS AND APPARATUS FOR PRODUCING WOODY MOLDINGS

(75) Inventors: Daijirou Ozaki, Tokyo (JP); Yutaka Suzuki, Kanagawa (JP); Masao Ooshiro, Tokyo (JP)

(73) Assignee: Misawa Homes Co., Ltd., Tokyo (JP)

( * ) Notice: Subject to any disclaimer, the term of this patent is extended or adjusted under 35 U.S.C. 154(b) by 203 days.

(21) Appl. No.: 10/477,220

(22) PCT Filed: May 2, 2002

(86) PCT No.: PCT/JP02/04394

§ 371 (c)(1),
(2), (4) Date: Nov. 10, 2003

(87) PCT Pub. No.: WO02/092309

PCT Pub. Date: Nov. 21, 2002

(65) Prior Publication Data

US 2004/0135282 A1    Jul. 15, 2004

(30) Foreign Application Priority Data

May 10, 2001    (JP) ............................. 2001-139938

(51) Int. Cl.
*B29B 9/02*    (2006.01)
*B29C 69/00*    (2006.01)

(52) U.S. Cl. ...................... 264/115; 264/140; 264/914; 425/205; 425/209

(58) Field of Classification Search ......... 264/109–128
See application file for complete search history.

(56) References Cited

U.S. PATENT DOCUMENTS

| 5,725,939 A | * | 3/1998 | Nishibori | ................. 428/292.4 |
| 6,017,475 A | * | 1/2000 | Cantrell | ...................... 264/140 |
| 6,066,367 A | * | 5/2000 | Nishibori | ................... 427/274 |

FOREIGN PATENT DOCUMENTS

| FR | 2859285 A1 | * | 8/2003 |
| JP | 54-122359 | | 9/1979 |
| JP | 57-75851 | | 5/1982 |
| JP | 60-161113 | | 8/1985 |
| JP | 62-23716 | | 1/1987 |
| JP | 11-070508 | | 3/1999 |
| JP | 11-129223 | | 5/1999 |
| JP | 11-254439 | | 9/1999 |
| JP | 2001-342315 | | 12/2001 |
| JP | 2002-64892 | | 2/2002 |

OTHER PUBLICATIONS

Edited by the Association of Powder Process Industry and Engineering, Japan, Zoryu Handbook, Ohmsha, Ltd., Mar. 10, 1991, II-hen 9-sho Kakuhan Zoryuho; pp. 379 to 407; particularly, pp. 379, 330 to 392.

\* cited by examiner

*Primary Examiner*—Mary Lynn Theisen
(74) *Attorney, Agent, or Firm*—Oblon, Spivak, McClelland, Maier & Neustadt, P.C.

(57) ABSTRACT

A method for producing woody moldings and an apparatus for producing woody moldings that can reduce the number of processing steps and shorten the processing time. Cellulose based fine powdery particles and thermoplastic resin are kneaded and dissolved into a mixed material, and the mixed material is cooled and agitated into a powdery particulate solid. Then, the powdery particulate solid is molded into a predetermined shape.

14 Claims, 2 Drawing Sheets

METHOD FOR PRODUCING WOODY MOLDINGS AND APPARATUS FOR PRODUCING WOODY MOLDINGS

FIELD OF THE INVENTION

The present invention relates to a method for producing woody moldings which contain cellulose based fine powdery particles obtained from woody materials and thermoplastic resin, and an apparatus for producing the woody moldings.

BACKGROUND ART

Nowadays, woody moldings are used in residential buildings as interior components, for example, rims, skirting bases, stair handrails, stair footboards, sash frames and pieces of furniture like tables and counters.

For production of such woody moldings, at first, cellulose based fine powdery particles are obtained from, for example, crushed natural wood and sawdust. Then, the cellulose based fine powdery particles are kneaded and dissolved with resin, and this composite material is extruded into pellets as a temporary shape. Finally, these pellets are used in extrusion molding or injection molding to produce appropriate shapes for such woody moldings.

As a method for producing such pellets, here, reference is made to a technique disclosed in Japanese Laid-Open Patent Publication No. H8-183028, which describes an injection-molded part of a synthetic resin as an interior part for use in automobile cabins.

At first, appropriate quantities of a thermoplastic resin such as polypropylene resin or ABS resin and a reinforcing filler such as talc or calcium carbonate are put into a Henschel mixer and mixed there. Then, the mixed material which has completed a mixing step by the Henschel mixer is supplied to an extruder and further mixed and kneaded there with additions of the thermoplastic resin and the reinforcing filler and then extruded through a die into a bar of resinous material. This bar of resinous material extruded through a die from the extruder is passed through a protein-powder adhesion machine, which provides protein powder that sticks the outer surface of the resinous material. Subsequently, the resinous material is cooled to a predetermined temperature in a coolant tank, and it is then made into resin pellets with an appropriate particle size by a pelletizer.

In other words, in the method disclosed in Japanese Laid-Open Patent Publication No. H8-183028, after the mixing step, the mixed material is made into the bar of resinous material through an extruder, cooled in a coolant tank, and then cut into resin pellets with an appropriate particle size by the pelletizer, and these pellets are used to produce injection-molded articles by injection molders.

Therefore, the production of molded articles in this method involves a relatively large number of processing steps. As a result, the processing is complicated, and it is difficult to reduce the total processing time.

The present invention has been developed in light of the above circumstance, and it is an object of the present invention to provide a method and an apparatus for producing woody moldings which can reduce the number of processing steps and shorten the processing time.

DISCLOSURE OF THE INVENTION

The present invention has been developed to solve the above mentioned problem. In accordance with a first aspect of the present invention, for example, as shown in FIG. 1, the method for producing a woody molding 1 which includes a thermoplastic resin 5 and a cellulose based fine powdery particle 3 collected from a woody material comprises:

a kneading step E in which the cellulose based fine powdery particle 3 and the thermoplastic resin 5 are kneaded and dissolved into a mixed material 7;

a cooling and agitating step F in which the mixed material 7 is cooled and agitated into a powdery particulate solid 9; and a molding step G in which the powdery particulate solid 9 is molded into a predetermined shape.

According to the present invention, with the kneading step E, the cooling and agitating step F and the molding step G, the cellulose based fine powdery particle 3 and the thermoplastic resin 5 are kneaded and dissolved into the mixed material 7, and this mixed material 7 is cooled and agitated into the powdery particulate solid 9 in the kneading step E and the cooling and agitating step F. Then, this powdery particulate solid 9 is immediately molded in the molding step G.

In other words, in the method according to the present invention which is different from an earlier developed method, the powdery particulate solid 9 is produced in the cooling and agitating step F without always performing the process of extruding a kneaded and dissolved mixed material by an extruder once as a bar of resinous material and then cooling and cutting them. Thus, this powdery particulate solid 9 is directly molded in the molding step G to produce the woody molding 1. As a result, the number of the processing steps is reduced, and the processing time is shortened.

Preferably, in the method for producing the woody molding 1 according to the first aspect of the present invention, the woody material is a wood rubbish 2 which includes a contaminant, and the thermoplastic resin 5 is a resinous rubbish 4 which includes a contaminant.

According to this method, the woody materials are the wood rubbish 2 which includes contaminant, and the thermoplastic resin 5 is the resinous rubbish 4 which includes contaminant. Thus, the method utilizes the wood rubbish 2 and the resinous rubbish 4, which is advantageous from the point of efficient use of resources and environmental protection.

The wood rubbish 2 used for the production may be, for example, a wood rubbish collected from torn-down residential buildings or from disassembled furniture, or parts of lumber dismissed as useless from construction of buildings or sawdust.

The resinous rubbish 4 may be, for example, a recycled container, a package and a tray used for foodstuffs including beverages, and the resinous rubbish 4 includes the thermoplastic resin 5 such as polypropylene resin, polyvinyl chloride resin, polyethylene resin, foamed vinyl chloride resin, polystyrene resin and ABS resin.

Preferably, the method for producing the woody molding 1 according to the first aspect of the present invention further comprises:

a separating step B in which the woody material is removed of a metallic material before the kneading step E; and pulverizing steps C and D in which the woody material after the separating step B is pulverized to achieve the cellulose based fine powdery particle 3.

According to this invention, the woody materials used for the production are removed of metallic materials in the separating step B, so the woody materials which do not include any metallic material are readily pulverized in the pulverizing steps C and D which follow the separating step B.

Because the woody materials are removed of metallic materials in the separating step B, when the woody materials without any metallic material are molded into the woody molding 1 in the molding step G, the moldability thereof is improved greatly.

In the separating step B, for example, a powerful magnet 12 is used to separate metallic materials that are attracted to the magnet, an eddy-current separator 12 is used to separate non-magnetic metals with electric conductivity, and a specific gravity separator 12 is used to separate metallic materials.

In accordance with a second aspect of the present invention, for example, as shown in FIG. 1, the molding production apparatus 6 which is used for the method for producing the woody molding 1 according to the first aspect of the present invention comprises:

a kneading section 8 in which the cellulose based fine powdery particle 3 and the thermoplastic resin 5 are kneaded and dissolved into the mixed material 7;

a cooling and agitating section 10 in which the mixed material 7 is cooled and agitated into the powdery particulate solid 9; and a molding section 11 in which the powdery particulate solid 9 is molded into a predetermined shape.

According to the invention, because the apparatus comprises the kneading section 8, the cooling and agitating section 10 and the molding section 11, the cooling and agitating section 10 and the molding section 11 knead and dissolve the cellulose based fine powdery particle 3 and the thermoplastic resin 5 into the mixed material 7, which is further cooled and agitated into the powdery particulate solid 9. Therefore, this powdery particulate solid 9 is molded immediately by the molding section 11.

In other words, in the apparatus according to the present invention which is different from the earlier developed method, the powdery particulate solid 9 is produced by the cooling and agitating section 10 without always performing the process of extruding a kneaded and dissolved mixed material by an extruder once as a bar of resinous material and then cooling and cutting them. Thus, this powdery particulate solid 9 is directly molded by the molding section 11 to produce the woody molding 1. As a result, the number of the processing steps is reduced, and the processing time is shortened.

The kneading section 8 comprises, for example, a mixer, and the cooling and agitating section 10 comprises, for example, a cooling mixer. The molding section 11 comprises, for example, an extruder or an injection molder.

Preferably, for example, as shown in FIG. 1, the woody molding production apparatus 6 according to the second aspect of the present invention, further comprises:

a separating section 12 in which the woody material is removed of a metallic material before the kneading step E; and pulverizing sections 13 and 15 in which the woody material which is removed of the metal material in the separating step B is pulverized to achieve the cellulose based fine powdery particle 3.

According to this apparatus, because the woody materials are removed of metallic materials by the separating section 12, the woody materials without any metallic material are pulverized easily by the pulverizing sections 13 and 15 which follow the separating section 12.

Because the woody materials are removed of metallic materials by the separating section 12, when the woody materials without any metallic material are molded into the woody molding 1 by the molding section 11, the moldability is improved.

The separating section 12 comprises, for example, a powerful magnet, an eddy-current separator or a specific gravity separator.

The pulverizing sections 13 and 15 comprise, for example, a hammer mill, a cutter mill, a roll mill or a pin mill.

Preferably, for example, as shown in FIG. 2, the woody molding production apparatus 6 according to the second aspect of the present invention, wherein the cooling and agitating section 10 comprises a first agitating wing 19 which rotates around a vertical axis and a second agitating wing 20 which rotates around a horizontal axis According to the invention, because the cooling and agitating section 10 has the first agitating wing 19 which rotates around a vertical axis and the second agitating wing 20 which rotates around a horizontal axis, the cooling and agitating section 10 can agitate the mixed material 7 around the vertical axis and the horizontal axis with the first and second agitating wings 19 and 20 to produce the powdery particulate solid 9.

In other words, in the apparatus according to the present invention which is different from the earlier developed method, the powdery particulate solid 9 is produced by the cooling and agitating section 10 which comprises the first agitating wing 19 and the second agitating wing 20 without always performing the process of extruding a kneaded and dissolved mixed material by an extruder once as a bar of resinous material and then cooling and cutting them. Thus, this powdery particulate solid 9 is directly molded by the molding section 11 to produce the woody molding 1. As a result, the number of the processing steps is reduced, and the processing time is shortened.

BEST MODE FOR CARRYING OUT THE INVENTION

An embodiment of the present invention will be described in reference to the drawings.

Figure 1:
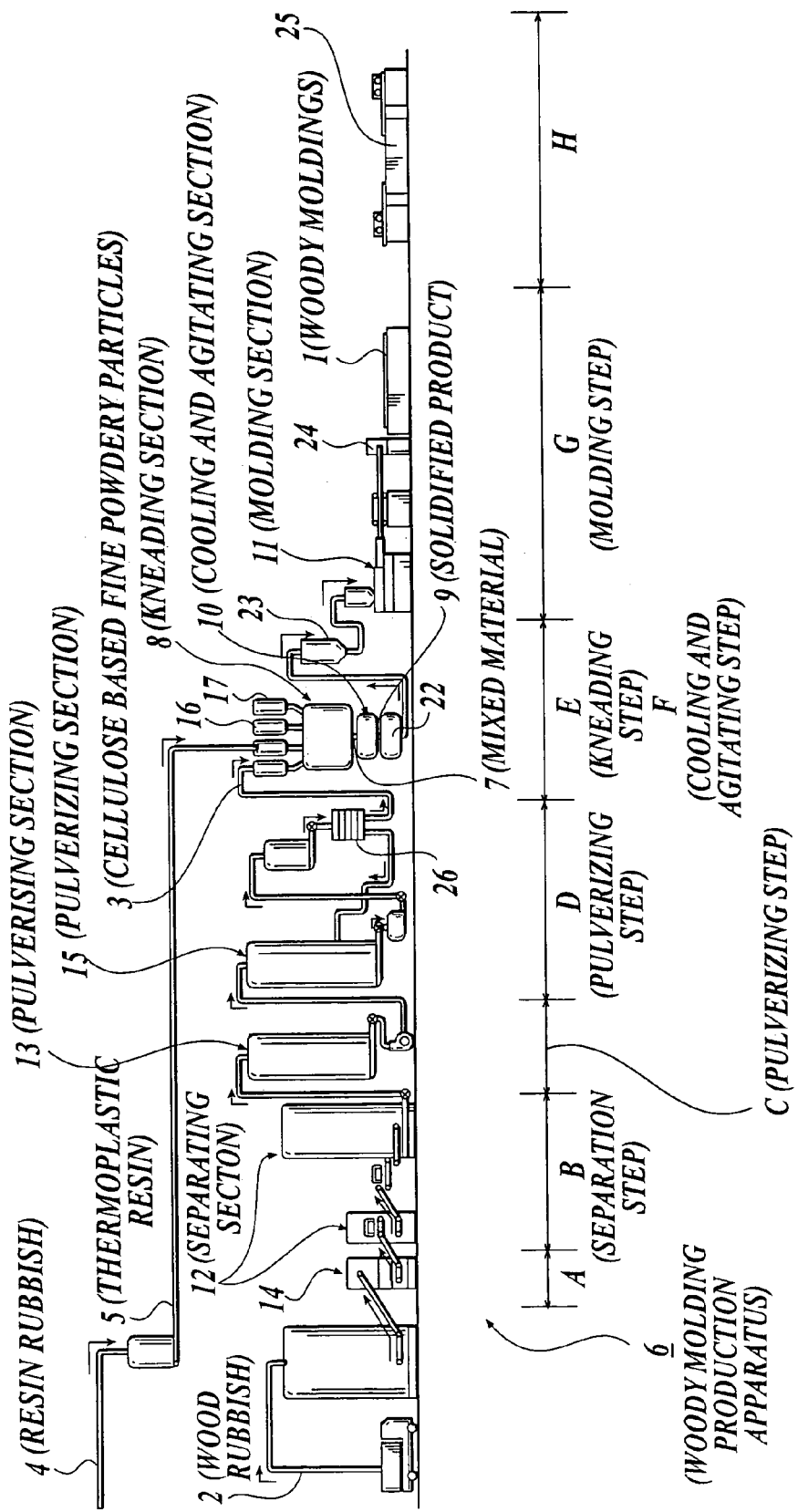
FIG. 1 is a schematic view showing manufacturing steps according to a manufacturing method for producing a woody molding of the present invention.
Figure 2:
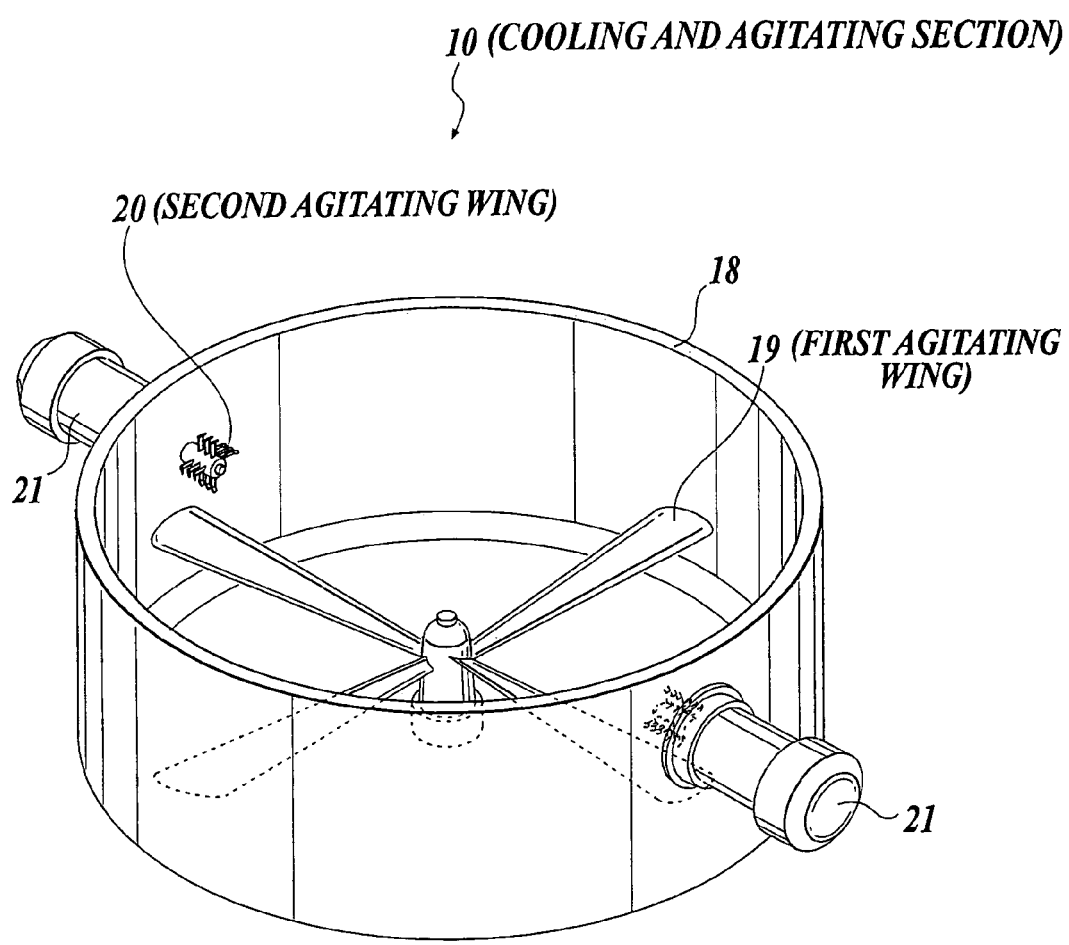
FIG. 2 is a perspective view of a cooling and agitating section of an apparatus for producing woody moldings.

FIG. 1 is a schematic view showing manufacturing steps according to a manufacturing method for producing woody moldings of the present invention, and FIG. 2 is a perspective view of a cooling and agitating section of an apparatus for the producing woody moldings.

A woody molding 1 which is produced according to the present invention contains cellulose based fine powdery particles 3 which are derived from wood rubbish 2 and thermoplastic resin 5 which is derived from resinous rubbish 4.

The following section describes a method for producing the woody molding 1 by using a woody molding production apparatus 6.

The woody molding production apparatus 6 comprises a kneading section 8 for mixing and dissolving the cellulose based fine powdery particles 3 which are derived from the wood rubbish 2 with the thermoplastic resin 5 into a mixed material 7, a cooling and agitating section 10 for cooling and agitating the mixed material 7 into powdery particulate solid 9, a molding section 11 for molding the powdery particulate solid 9 into a predetermined shape, a separating section 12 for removing metallic materials from the wood rubbish 2 before the kneading section 8, and a pulverizing section 13 for pulverizing the wood rubbish 2 which does not include any metallic material by the separating section 12 into the cellulose based fine powdery particles 3.

As shown in FIG. 1, in the woody molding production apparatus 6, at first, pieces of wood rubbish 2 with sizes of four to five centimeters are crushed into fragments of several millimeters (first pulverizing step A).

The wood rubbish 2 used here may be, for example, wood rubbish collected from a torn-down residential building or from disassembled furniture, or parts of lumber dismissed as useless from construction of buildings or sawdust.

The pulverizer 14 used in the first pulverizing step A has an ability to pulverize the wood rubbish into relatively large pieces with sizes of several millimeters. Specifically, the pulverizer 14 comprises two rollers which oppose each other, and a plurality of projections are formed on a surface of the two rollers. The pulverizer 14 rotates the rollers while applying pressure between the rollers to pulverize things which pass therebetween. It is to be understood that the pulverizer 14 is not limited thereto, and any other types of pulverizers for coarse crushing may be used as long as an equivalent ability is secured. For example, a jaw crusher in which raw material is put between a jaw and a vibrating jaw which forms a V figure upwardly and crushed by applying pressure, or a gyratory crusher in which the material is pulverized continuously with a movable pulverizing surface rotating on a fixed pulverizing surface may be used.

After the pulverization, the pulverized wood rubbish 2 is exposed to a powerful magnet (separating section) 12 for removing magnetic metals and then to an eddy-current separator (separating section) 12 for removing non-magnetic metals with electric conductivity. In addition, the wood rubbish 2 is passed through a specific gravity separator (separating section) 12 for removing metallic materials or stones that have remained therein after the magnetic separation (separating step B).

In the following second pulverizing step C, the first pulverized materials which have been pulverized in the first pulverizing step A are further pulverized into particles. The pulverizer (pulverizing section) 13 used in the second pulverizing step C has an ability to pulverize the pre-pulverized relatively large pieces into particles of approximately one millimeter. Specifically, a hammer mill which smashes material repeatedly by hammer chips revolving rapidly until they are reduced in size enough to pass through circular holes of the screens provided around the hammer chips is used. Of course, the pulverizer 13 is not limited thereto, and any other types of pulverizers may be used as long as an equivalent ability is secured. For example, a cutter mill which shreds materials by cutters, or a roller mill which crushes by rollers may be used instead.

In the following third pulverizing step D, the second pulverized materials which have been pulverized in the second pulverizing step C are further pulverized into powder as the cellulose based fine powdery particles 3. The pulverizer (pulverizing section) 15 used in the third pulverizing step D has an ability to pulverize the materials that have been processed in the second pulverizing step C into powdery or finer particles.

Specifically, this is a pin mill which can pulverize materials into powder by the interaction of impact and collision by pins which are attached to a disc. More specifically, the pin mill comprises a rotating disc with a plurality of vertical pins and a fixed disc with a plurality of pins on a surface which opposes the rotating disk. In the pin mill, the materials that have been processed in the second pulverizing step C are fed in the center of the rotating disc, so that they are thrown into the space among the pins of the rotating and fixed discs by the centrifugal force and are pulverized into powder by the interaction of impact and collision by the pins. In the third pulverizing step D, a particle size of approximately 500 micrometers is achieved by the pin mill. Of course, the pulverizer 15 is not limited thereto, and any other types of fine pulverizers may be used as long as an equivalent ability is secured. For example, a ball mill or a stone mill may be used.

As mentioned above, the recycled wood rubbish 2 is pulverized efficiently in three steps, i.e., the first pulverizing step A, the second pulverizing step C, and the third pulverizing step D.

Now, the cellulose based fine powdery particles 3 which have been processed by the first, second and third pulverizing steps A, C and D, are screened with a mesh size of 500 micrometers to achieve an average particle size of 300 micrometers. In other words, the cellulose based fine powdery particles 3 are passed through a sieve 26, and particle of 500 micrometers and greater is returned to the pulverizer 15 for repulverization.

Then, the cellulose based fine powdery particles 3 with an average particle diameter of 300 micrometers and inorganic pigment with a particle size of several micrometers are measured by a load-cell type automatic weighing device in an appropriate quantity, fed into a mixer (kneading section) 8 which is preheated by an oil type temperature control device, and generate heat by self-heating (friction heat) to be agitated at 175 degrees C. In this case, the inorganic pigment is thrown into the mixer 8 from an inorganic pigment injection port 16 to dust the inorganic pigment on the cellulose based fine powdery particles 3.

On the other hand, the resinous rubbish 4 is pulverized roughly by a hammer mill to achieve the thermoplastic resin 5.

The resinous rubbish 4 here is collected from, for example, a recycled container, a package and a tray used for foodstuffs including beverages, and the resinous rubbish 4 includes such materials as polypropylene resin, polyvinyl chloride resin, polyethylene resin, foamed vinyl chloride resin, polystyrene resin and ABS resin.

The obtained thermoplastic resin 5 and reinforcing agent are fed into the mixer 8 which is mixing the cellulose based fine powdery particles 3 and the inorganic pigment, and the mixture is further agitated at 185 degrees C. The agitation is executed at a high rotational speed that is followed by a low rotational speed, and then the mixture is kneaded at a low speed for about three minutes to obtain a mixed material 7 (kneading step E).

The above mentioned reinforcing agent is added to improve the adherence of the thermoplastic resin 5 onto the cellulose based fine powdery particle 3, and it is fed from a reinforcing agent injection port 17 into the mixer 8.

These components of the woody molding 1 are adjusted to include, as a whole, the powdery cellulose particles 3 derived from wood rubbish 2 and the inorganic pigment together at 55% and the thermoplastic resin 5 derived from resinous rubbish 4 and the reinforcing agent together at 45%. Next, the mixed material 7 is fed into a cooling mixer (cooling and agitating section) 10 and is agitated until it cools off to 80 degrees C. The cooled mixed material 7 becomes the powdery particulate solid 9 (cooling and agitating step F).

As shown in FIG. 2, the cooling mixer 10 comprises a mixing tank 18, a first agitating wing 19 which is provided at the bottom inside the mixing tank 18 and rotates around a vertical axis, two second agitating wings 20 which are provided at the inner circumferential surface of the mixing tank 18 and rotate around a horizontal axis, and motors 21 which are provided on the outer circumferential surface of the mixing tank 18 at the each second agitating wing 20 to drive the second agitating wings 20. In addition, a cooling device to cool inside the mixing tank 18 and a motor to drive the first agitating wing 19 are also provided although they are not illustrated in the drawing.

The first agitating wing 19 has four vanes and agitates the material which is fed in around the vertical axis.

Each of the second agitating wings 20 has a plurality of small vanes and agitates the material around the horizontal axis. The second agitating wings 20 agitate the material which was agitated by the first agitating wing 19 more finely.

When the mixed material 7 is fed in the cooling mixer 10, the mixed material 7 is agitated by the first agitating wing 19 and the second agitating wings 20 to be the powdery particulate solid 9.

The powdery particulate solid 9 is then passed through a sieve 22 and stored in a storage tank 23, and the process proceeds to the molding step G.

In the molding step G, the powdery particulate solid 9 is fed into a hopper of the extruder (molding section) 11 which leads to a heating cylinder. There, the powdery particulate solid 9 is melted and extruded by a screw which is provided inside the extruder 11, and is extruded through a molding die to mold the material into a predetermined shape.

The molding temperature is set at 180~220 degrees C. for molding. This temperature range is preferable because if the temperature is below 180 degrees C., it is difficult to mix the thermoplastic resin 5 with the cellulose based fine powdery particle 3 uniformly because the softening of the thermoplastic resin 5 is not enough. On the other hand, if the temperature is equal to or more than 220 degrees C., the cellulose based fine powdery particles 3 tend to experience carbonization from excess heat.

Subsequently, the woody molding 1 being extruded is led by a conveyer at a constant speed to a cutting machine 24, and is cut in a predetermined length. After that, the woody molding 1 is led by the conveyer to a processing table 25, where it is given a surface treatment (surface-treating step H).

In the surface treatment, at first, an emboss processing is executed. In other words, an embosser which comprises a rotational shaft and a cylindrical emboss roller rotatable around the rotational shaft is applied to form a plurality of grooves on a surface of the woody molding 1 by rotating the emboss roller while pressing it from upward with respect to the woody molding 1.

In the following hairline-processing step, a sanding paper is applied to make many scratches on the surface of the woody molding 1.

In the following coloring step, the woody molding 1 is painted with color paint or subjected to a wiping stain treatment, in which the paint applied on the surface of the woody molding 1 is wiped out while it is still wet to paint only the grooves which have been created in the previous emboss processing.

After the coloring step, the surface of the woody molding 1 painted with color paint is dried in a drying step and then polished in a polishing step.

By using a polisher, the woody molding 1 is polished while it is being extruded along the rotation of the polishing roller of the polisher.

After the polishing step, a coating step is performed. This coating step includes an intermediate coating step and a final coating step. In the intermediate coating step, a color sanding sealer is applied onto all the surfaces of the woody molding 1. If necessary, UV coating may be applied before or after the intermediate coating. In the final coating step, a topcoat is applied on the surfaces of the woody molding 1, and the UV coating is applied over the topcoat to cure the topcoat.

According to the method for producing the woody molding 1 of the embodiment in the present invention, after the cellulose based fine powdery particles 3 and the thermoplastic resin 5 are kneaded and dissolved into the mixed material 7 in the kneading step E and the cooling and agitating step F, which is further cooled off and agitated to be the powdery particulate solid 9. Thus, the powdery particulate solid 9 can be immediately molded in the molding step G.

In other words, in the apparatus according to the present invention which is different from the earlier developed method, the powdery particulate solid 9 is produced in the cooling and agitating step F without always performing the process of extruding a kneaded and dissolved mixed material by an extruder once as a bar of resinous material and then cooling and cutting them. Thus, this powdery particulate solid 9 is directly molded in the molding step G to produce the woody molding 1. As a result, the number of the processing steps is reduced, and the processing time is shortened.

Because the cellulose based fine powdery particles 3 are collected from the wood rubbish 2 which includes contaminant, and also the thermoplastic resin 5 is collected from resinous rubbish 4 which includes contaminant, it is advantageous from the point of view of efficient use of resources and environmental protection.

In the separating step B, metallic materials are removed from the woody materials, so the woody materials separated do not contain any metallic material. Therefore, the woody materials are easily pulverized in the pulverizing steps C and D which follow the separating step B.

Because the woody materials are removed of metallic materials in the separating step B, the moldability is greatly improved when producing the woody molding 1 from the woody materials with no metallic material in the molding step G.

According to the woody molding production apparatus 6 of the embodiment in the present invention, the apparatus 6 comprises the kneading section 8, the cooling and agitating section 10, the molding section 11, the separating section 12 and the pulverizing section 13, so that the cellulose based fine powdery particles 3 and the thermoplastic resin 5 are mixed and dissolved into the mixed material 7, which is further cooled and agitated into the powdery particulate solid 9. Therefore, the powdery particulate solid 9 is directly molded immediately in the molding section 11 to produce the woody molding 1 without any cutting, which is different from the earlier developed apparatus. As a result, the number of processing steps is relatively small, and the processing time required is relatively short.

Because the woody materials are removed of metallic materials in the separating section 12, the woody materials without any metallic material are easily pulverized in a fine powder in the pulverizing section 13 which follows the separating section 12, and the moldability is improved when molding by the molding section 11.

Furthermore, because the cooling and agitating section 10 comprises the first agitating wing 19 and the second agitating wings 20, the mixed material 7 which is agitated around a vertical axis as well as around a horizontal axis can be made into the powdery particulate solid 9. This powdery particulate solid 9 is then immediately molded in the molding section 11 which follows the cooling and agitating section 10. As a result, the production of the woody molding 1 is executed relatively easily.

In the above embodiment according to the present invention, the cellulose based fine powdery particles 3 are collected from the wood rubbish 2. However, the source of the cellulose based fine powdery particles 3 are not limited to this. The cellulose based fine powdery particles 3 may be collected by pulverizing natural materials such as wood, bagasse and rice straw.

EFFECT IN INDUSTRY

As described above, according to this invention, the cellulose based fine powdery particles and the thermoplastic resin are kneaded and dissolved into the mixed material in a kneading step and a cooling and agitating step. Then, this mixed material is further cooled and agitated into the powdery particulate solid. In this way, no cutting is involved, which is different from a conventionally practiced method. The powdery particulate solid is directly molded to produce a woody molding immediately in the molding step. As a result, the number of processing steps involved in the production is reduced, and the processing time is shortened. Therefore, the present invention is highly suitable for production of woody moldings that contain the cellulose based fine powdery particles and the thermoplastic resin.

What is claimed is:

1. A method for producing a woody molding that contains a thermoplastic resin and a cellulose based fine powdery particle which is collected from a woody material comprising:
    a separating step in which the woody material is removed of a contaminant, wherein the woody material is a wood rubbish which includes the contaminant;
    a pulverizing step in which the woody material, after the separating step, is pulverized to achieve the cellulose based fine powdery particle;
    a kneading step in which the cellulose based fine powdery particle and the thermoplastic resin are kneaded and dissolved into a mixed material, by heating the cellulose based fine powdery particle and the thermoplastic resin;
    a cooling and agitating step in which the mixed material is cooled and agitated into a powdery particulate solid by rotating a first agitating wing which rotates around a vertical axis and a second agitating wing which rotates around a horizontal axis, together; and
    a molding step in which the powdery particulate solid is molded into a predetermined shape.

2. A woody molding production apparatus used for a method for producing a woody molding, comprising:
    a separating step in which the woody material is removed of a contaminant, wherein the woody material is a wood rubbish which includes the contaminant;
    a pulverizing section in which the woody material which is removed of a metal material by the separating section, is pulverized to achieve a cellulose based fine powdery particle;
    a kneading section in which the cellulose based fine powdery particle and a thermoplastic resin are kneaded and dissolved into a mixed material by heating the cellulose based fine powdery particle and the thermoplastic resin;
    a cooling and agitating section in which the mixed material is cooled and agitated into a powdery particulate solid by rotating a first agitating wing which rotates around a vertical axis and a second agitating wing which rotates around a horizontal axis, together in a mixing tank; and
    a molding section in which the powdery particulate solid is molded into a predetermined shape.

3. The method for producing a woody molding as claimed in claim 1, wherein the contaminant includes metallic materials.

4. The method for producing a woody molding as claimed in claim 3, wherein the separating step includes removal of magnetic metals by a powerful magnet.

5. The method for producing a woody molding as claimed in claim 4, wherein the separating step further includes removal of non-magnetic metals with electric conductivity by an eddy-current separator.

6. The method for producing a woody molding as claimed in claim 1, wherein the separating step includes removal of the contaminant by a specific gravity separator.

7. The woody molding production apparatus as claimed in claim 2, wherein the contaminant includes metallic materials.

8. The woody molding production apparatus as claimed in claim 7, wherein the separation section includes a powerful magnet configured to remove magnetic metals.

9. The woody molding production apparatus as claimed in claim 8, wherein the separation section further includes an eddy-current separator configured to remove magnetic metals with electric conductivity.

10. The woody molding production apparatus as claimed in claim 2, wherein the separating section includes a specific gravity separator configured to remove the contaminant.

11. The method for producing a woody molding as claimed in claim 1, wherein one of the first agitating wing and the second agitating wing agitates the material which was agitated by the other agitating wing, more finely.

12. The woody molding producing apparatus as claimed in claim 2, wherein the cooling and agitating section is configured such that one of the first agitating wing and the second agitating wing agitates the material which was agitated by the other agitating wing, more finely in the mixing tank.

13. The woody molding producing apparatus as claimed in claim 12, wherein the first agitating wing is provided at the bottom inside the mixing tank and the second agitating is provided at an inner circumferential surface of the mixing tank.

14. The woody molding production apparatus as claimed in claim 13, further comprising a third agitating wing which is provided at the inner circumferential surface of the mixing tank, to rotate around a horizontal axis, together with the second agitating wing.

* * * * *